(No Model.)
J. P. L'HOMEDIEU.
PULVERIZER ATTACHMENT FOR HARROWS.
No. 462,980. Patented Nov. 10, 1891.
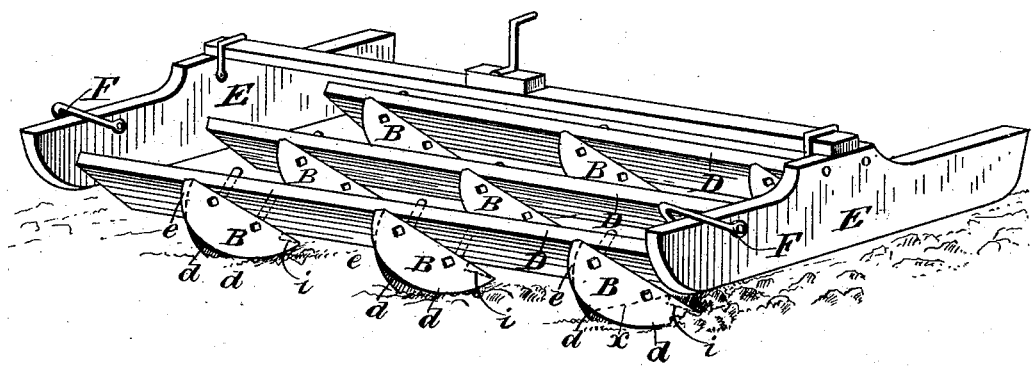
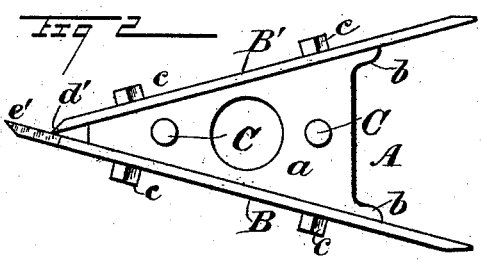 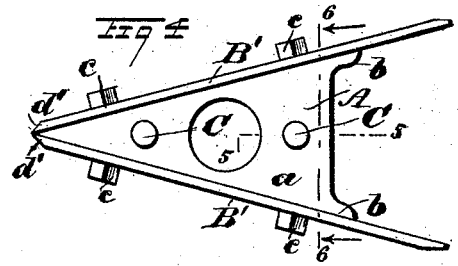
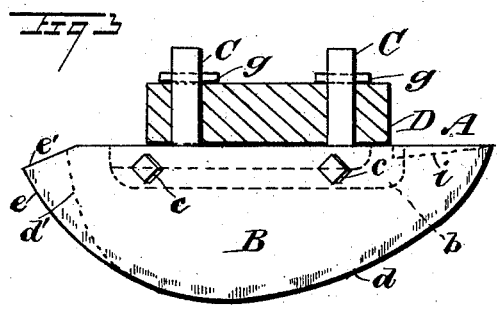 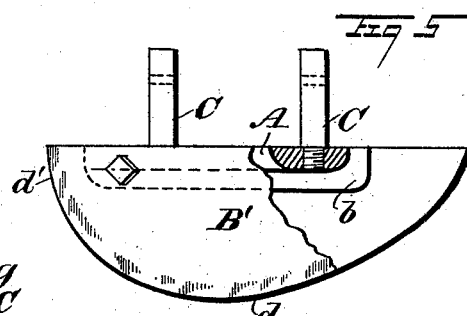
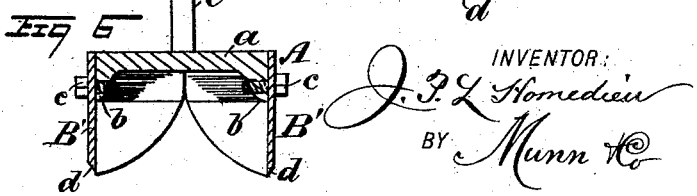
WITNESSES:
H. Walker
C. Sedgwick
INVENTOR:
J. P. L'Homedieu
BY Munn & Co
ATTORNEYS

UNITED STATES PATENT OFFICE.

JOHN P. L'HOMEDIEU, OF SETAUKET, NEW YORK.

PULVERIZER ATTACHMENT FOR HARROWS.

SPECIFICATION forming part of Letters Patent No. 462,980, dated November 10, 1891.

Application filed May 6, 1891. Serial No. 391,738. (No model.)

*To all whom it may concern:*

Be it known that I, JOHN P. L'HOMEDIEU, of Setauket, in the county of Suffolk and State of New York, have invented a new and Improved Pulverizing Attachment to be Used on a Harrow or Like Implement, of which the following is a full, clear, and exact description.

This invention relates to an improved soil-pulverizer which is designed to take the place of harrow-teeth or the usual shovels on a harrow or cultivator, the object being to afford a simple and perfect soil-disintegrator which is easily applied to implements of the class indicated and that when attached in suitable number will afford a superior device that will surmount obstructions and operate satisfactorily in any quality of soil.

To these ends my invention consists in the construction and combination of parts, as is hereinafter described and claimed.

Reference is to be had to the accompanying drawings, forming a part of this specification, in which similar letters of reference indicate corresponding parts in all the figures.

Figure 1 is a perspective view of a harrow-frame having the improvement secured on it ready for service as a harrow. Fig. 2 is a plan view of the device in preferred form. Fig. 3 is a side view of the preferred form of the ground-pulverizer attached to a harrow-beam, shown in transverse section. Fig. 4 is a plan view of a modified form of the device. Fig. 5 is a side view of the attachment shown in Fig. 4, partly in section, taken on the line 5 5 in said figure; and Fig. 6 is a transverse section on the line 6 6 in Fig. 4.

The important features of this improved device for the cutting, crushing, and complete disintegration of hard soil that has been previously plowed, either in the direction of the furrows or across the same, consists of a head-stock A, preferably cast into form which is V-shaped, as viewed from its top plate, (shown at $a$ in Figs. 2 and 4,) said stock being further provided with depending flanges $b$, formed on the side edges of the top plate, as shown in Fig. 6.

On the flanges $b$ as supports there are cutter-blades B B', secured by the screw-bolts $c$, that pass through holes in the blades and engage tapped holes in the flanges. In the preferred method of forming the cutter-blades for each head-stock A the front edge portion of one blade B is made of somewhat different shape from the blade B', that is oppositely secured on said stock, the remaining portions of the two cutter-blades being similar in form. Preferably the cutter-blades are made of steel plate having a proper thickness to render them substantial, the blade B' having its edge $d$, that engages the ground in use, made semi-ovate, with the major curve of the same in the lead on the head-stock, as shown by a dotted line at $d'$ in Fig. 3. The blade B is given a shape nearly semi-elliptical, the major axis of which exceeds the length of the blade B', this increase in length being projected in advance of the front edge $d'$ of the cutter-blade B'. The upper edge portion at the front is preferably sloped on an incline downwardly, forming an angular point at $e'$, and below said point a curved cutting-edge $e$, which is in advance of the edge $d'$ on the other blade B'. The paired cutter-blades B B', attached upon the head-stock A, are at right angles to the top of said stock, and on account of its triangular form approach each other forwardly, the blade B crossing the path of the blade B', so that its cutting-edge $e$, which presents an acute angle to the ground surface, will cut through the same readily and ride upon or cut off vines, stalks, or similar obstructions without hinderance or bury the same in the soil, and in case a rigid obstruction is encountered the entire device will slide over it without injury, if not too high for the blades to mount.

Preferably the pulverizers are attached to transverse harrow-beams as follows: On a line that represents the center of the triangular top plate $a$ of head-stock A two studs C are erected parallel to each other, having a proper length to pass through perforations made in a harrow cross-beam D, as shown in Fig. 3, and be therein secured by pins or keys $g$.

It is preferred to use the device constructed as has been described in connection with the improved cultivator or harrow patented by me September 23, 1890, No. 436,795, wherein the beams D are adjustably secured in two side runners E, so that said beams may be given different degrees of inclination to the ground operated upon.

There are series of the soil-pulverizing attachments that are the subject of this invention shown attached to inclined cross-beams D in Fig. 1, wherein the patented improvements are embodied, so that the rear ends of the pulverizers will be pitched downwardly at such an inclination to the soil as to cause the diverging blades B B' to enter the ground as the harrow-frame is drawn forwardly, there being draft-chains (not shown) attached to the clevises F and forwardly projected to be attached to one or more draft-animals for the movement of the harrow over the ground to be operated upon. It will be seen that the edges of the cutter-blades B B' are beveled from the exterior surface of each blade inwardly and downwardly, the object of which is to render them self-sharpening, as the contact of the soil through which they are drawn being abrasive on the external faces of the blades such attrition will cause the edges to wear away evenly and keep them sharpened.

In service the progressive movement of the harrow that is furnished with the improvement will cause the series of attachments on each beam D to be embedded in the ground to a point indicated by the dotted line $x$ in Fig. 1, and the soil penetrated by the sharpened front edges $e$ of the blades B, that lead the blades B', as has been explained. Owing to the shearing action of the blade-edges $e$ of the blades B, they will cut off all small roots, vines, or other similar impediments and ride over fixed obstructions, such as buried stones, limbs, or stumps, as before mentioned. The angular divergence of each pair of blades B B', when forwardly moved, causes the soil that intervenes between each pair of pulverizers to be crowded laterally and fall over their top edges, so that there is a level and perfectly-disintegrated body of soil left in the rear of the moving harrow.

In Figs. 4, 5, and 6 the cutting-blades are of the same shape, which is similar to the blade B' on the pulverizer, already described, these blades having their front edges joined, as represented in Fig. 4, and diverging equally.

The modified form of the cutter-blades is equally efficient in soil that is not obstructed by stalks, vines, or roots, and operates similarly in comminution of the ground over and through which they are drawn.

It will be evident that the improved ground-pulverizer herein described may be readily applied to ordinary cultivator-frames, if desired, and afford effective service.

In some cases it may be found of advantage to cut away the top edge of the blades B B' on the leading pulverizers, as indicated in dotted lines at $i$ in Figs. 1 and 3, the reduction in the length of said blades permitting the soil to flow over them more readily.

Having thus described my invention, I claim as new and desire to secure by Letters Patent—

1. An attachment for a harrow or cultivator frame to pulverize soil, consisting of a triangular head-stock, two depending blades secured on the head-stock oppositely, so as to diverge from the front end rearwardly, having their lower edges curved and sharpened, and a securing device for attaching the pulverizer to a harrow or cultivator frame, substantially as described.

2. An attachment for a harrow or cultivator frame to pulverize soil, consisting of a triangular head-stock, depending flanges on the diverging edges of the stock, and two cutter-blades secured on said flanges, one in advance of the other, said blades having curved edges that are beveled on their exterior surfaces to sharpen them, and a securing device for the head-stock, substantially as set forth.

3. An attachment for a harrow or cultivator frame to pulverize soil, consisting of a triangular head-stock, depending flanges on said stock that diverge from the front end, a cutter-blade for one side of the head-stock having its cutting lower edge ovate in contour, a cutter-blade on the other side of the head-stock having its cutting-edge elliptical and of greater length than the ovate-edged blade, projecting forwardly of said blade, both blades secured removably on the head-stock and beveled on the outer sides of their cutting-edges, and studs projected from the head-stock on its upper side, substantially as described.

4. A soil-pulverizing device for attachment in series on the cross-beams of a harrow, consisting of a head-stock having a top plate which diverges on its side edges rearward and is provided with an integral depending flange on each side edge, two spaced projecting studs which enter perforations in the harrow-beam, and a blade for each side of the head-stock, composed of plate metal, having curved lower edges which are beveled from the exterior face inwardly to sharpen them and each bolted removably to the flanges of the head-stock, their front edges being either directly opposite or one projected in advance of the other, substantially as described.

JOHN P. L'HOMEDIEU.

Witnesses:
  ALBERT T. NORTON,
  WM. H. BAYLES.